United States Patent Office
3,451,147
Patented June 24, 1969

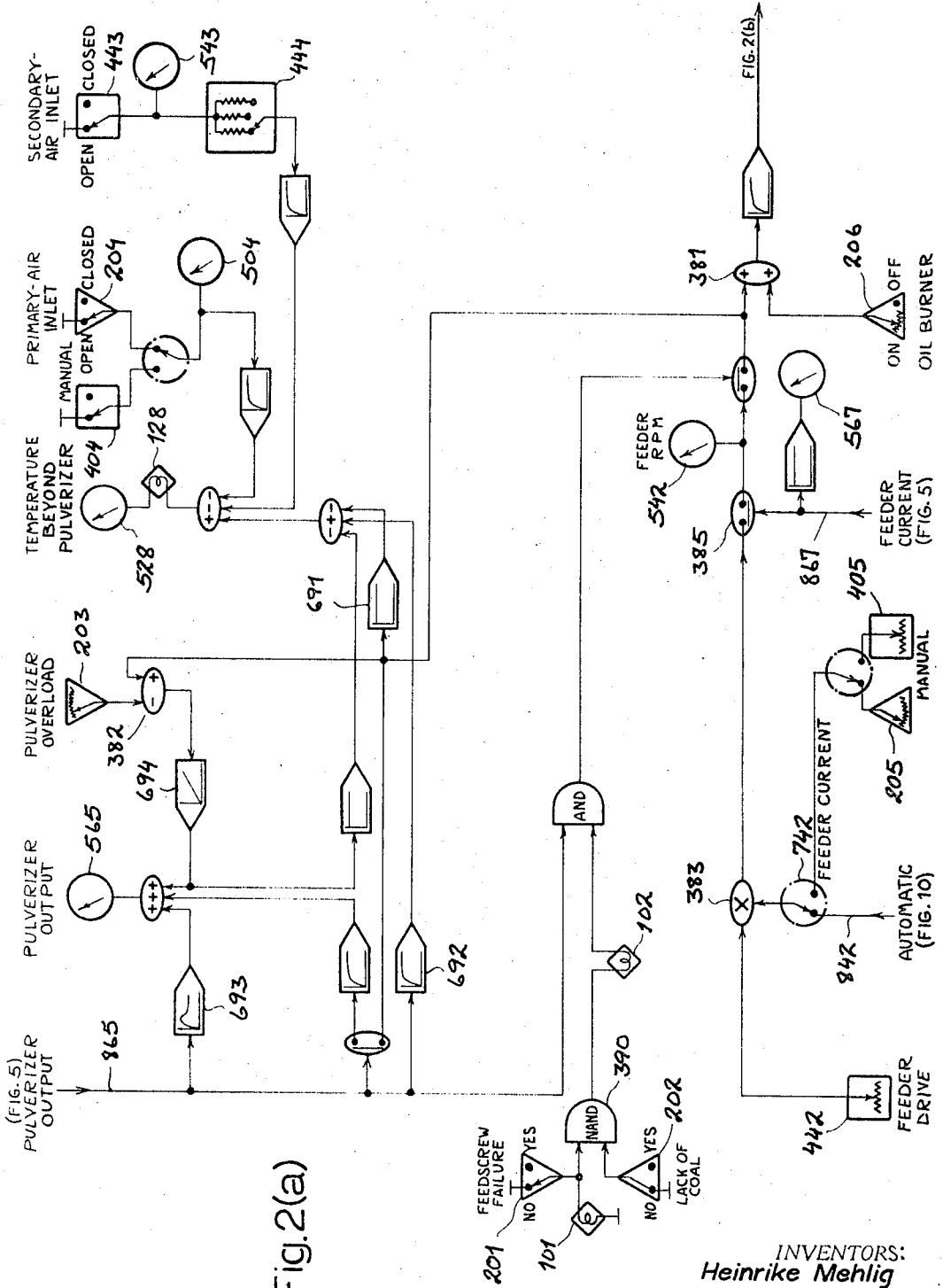

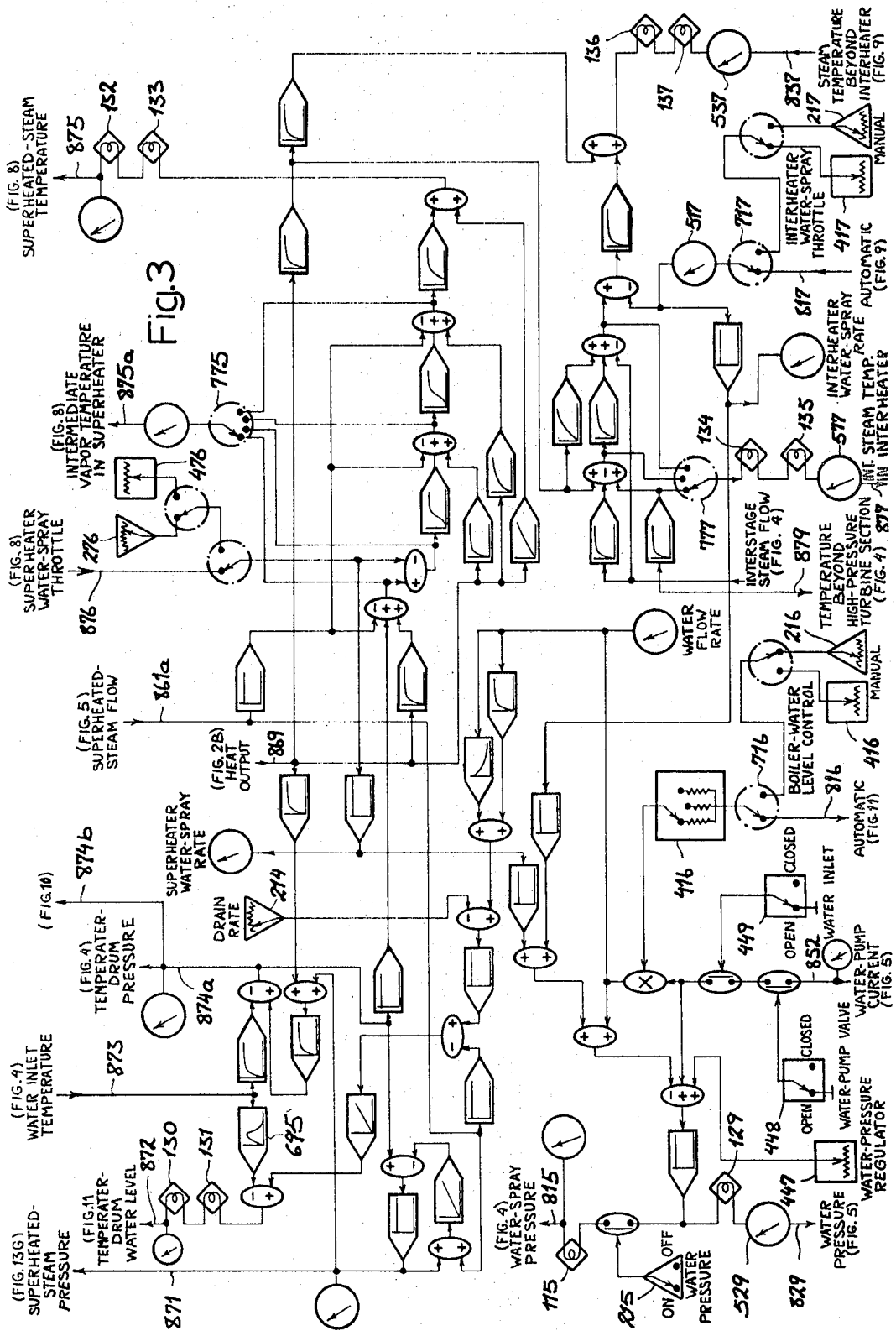

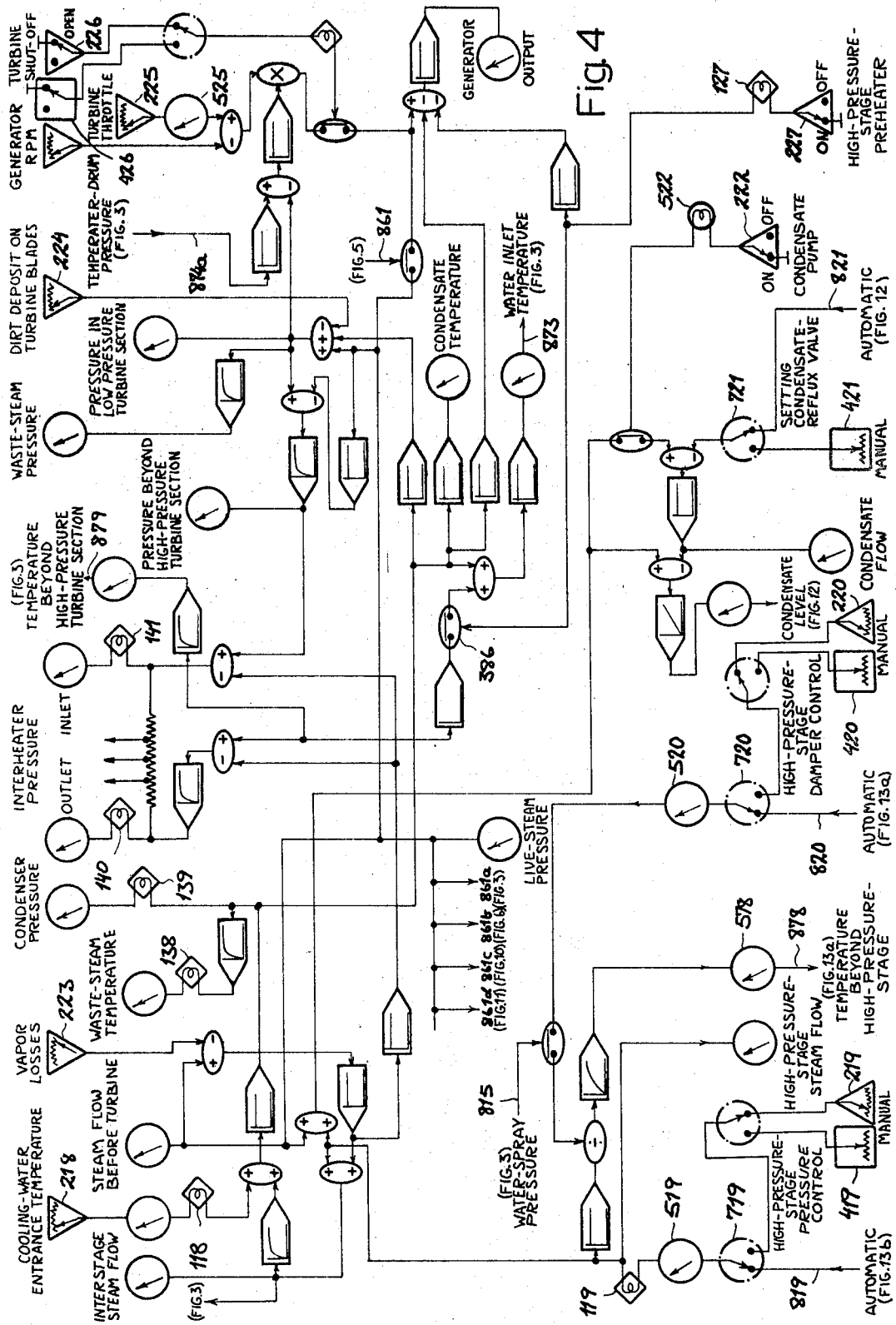

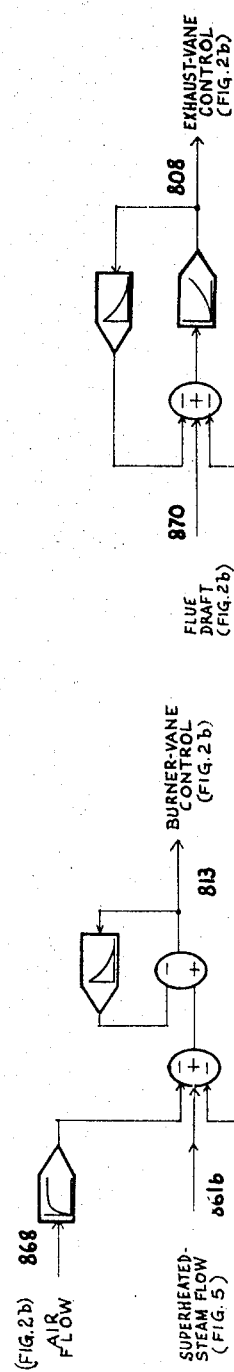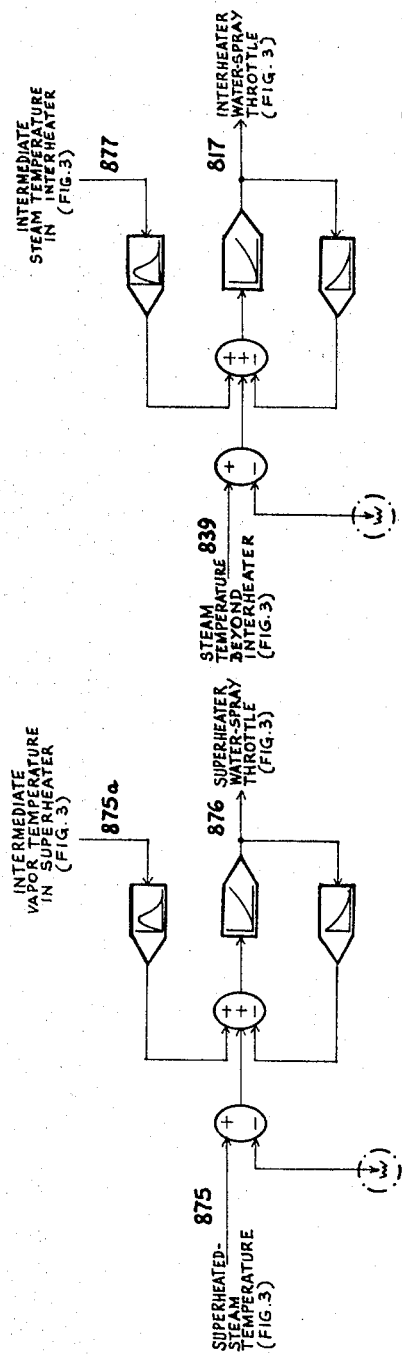

3,451,147
TRAINING SYSTEM FOR THE OPERATION OF INDUSTRIAL PLANTS
Heinrike Mehlig and Christian Walter, Leipzig, Germany, assignors to Institut fur Energetik, Leipzig, Germany, a corporation of Germany
Filed May 31, 1966, Ser. No. 554,087
Int. Cl. G09b 25/02
U.S. Cl. 35—13    6 Claims

ABSTRACT OF THE DISCLOSURE

System for the training of personnel in the operation of a power plant with switches settable in part by an instructor and in part by a trainee to symbolize specific operating conditions at a plant simulated thereby, these switches controlling logical circuitry for the selective establishment and maintenance of simulated abnormal conditions to be corrected by the trainee.

---

Our present invention relates to an apparatus for the training of personnel in the operation of intricate industrial plants such as, for example, a steam-driven power station.

The many possible variations in the numerous parameters affecting the operation of such plans requires the provision of a large number of different types of indicators which a skilled operator must be capable of overseeing and interpreting so as to detect in time any sign of a potential breakdown. Since this degree of skill can be acquired only by extensive training, and since the use of actual machinery for such training purposes would be both wasteful and dangerous, it is desirable to have available an apparatus which can simulate the various operating conditions of a particular plant for purposes of instruction and testing.

Thus, the general object of our invention is to provide an apparatus of this type which is versatile enough to simulate the most diverse condition of actual operation yet which, at the same time, is relatively compact and easily handled by both the instructor and the trainee.

This object is realized, in accordance with our present invention, by the provision of a training apparatus which comprises a set of indicators representative of a multiplicity of functions of the plant to be simulated, along with a set of controls respectively assigned to these functions, the indicators and the controls being operatively interconnected by transmission means which include function generators responsive to the various controls and electronic circuitry by which the outputs of the function generators can be selectively combined for the operation of the indicators.

More specifically, according to another feature of our invention, the electronic circuitry is divided into an arithmetical or analog part and a logical or binary part, the later part including the usual AND, OR etc. gates for the energization of associated indicators. Some of these binary gates may be provided with feedback loops adapted to maintain a simulated operative condition irrespectively of the setting of an associated control; this enables the simulation of a continuing energized state of, say, a feed motor or an air blower upon momentary closure of a starting switch.

The controls, especially those for the analog part of the system, need not be wholly electric but may include, for example, pneumatic actuators for the setting of various voltage sources. It will also be convenient to provide juxtaposed but separate panels or other physical mountings for different types of controls and indicators, e.g. for setting switches operable by the trainee, modification switches operable by the instructor to simulate abnormal conditions by interfering with the operation of some of the setting switches, alarm devices signaling the existence of such simulated abnormal conditions, and other types of indicators registering the various parameters during normal operations.

The invention will be described in greater detail with reference to the accompanying drawing in which:

FIGS. 2, 3, 4 and 5 are circuit diagrams illustrating major portions of the system of FIG. 1; and FIGS. 6–13 are circuit diagrams showing additional details of the system.

Figure 1:
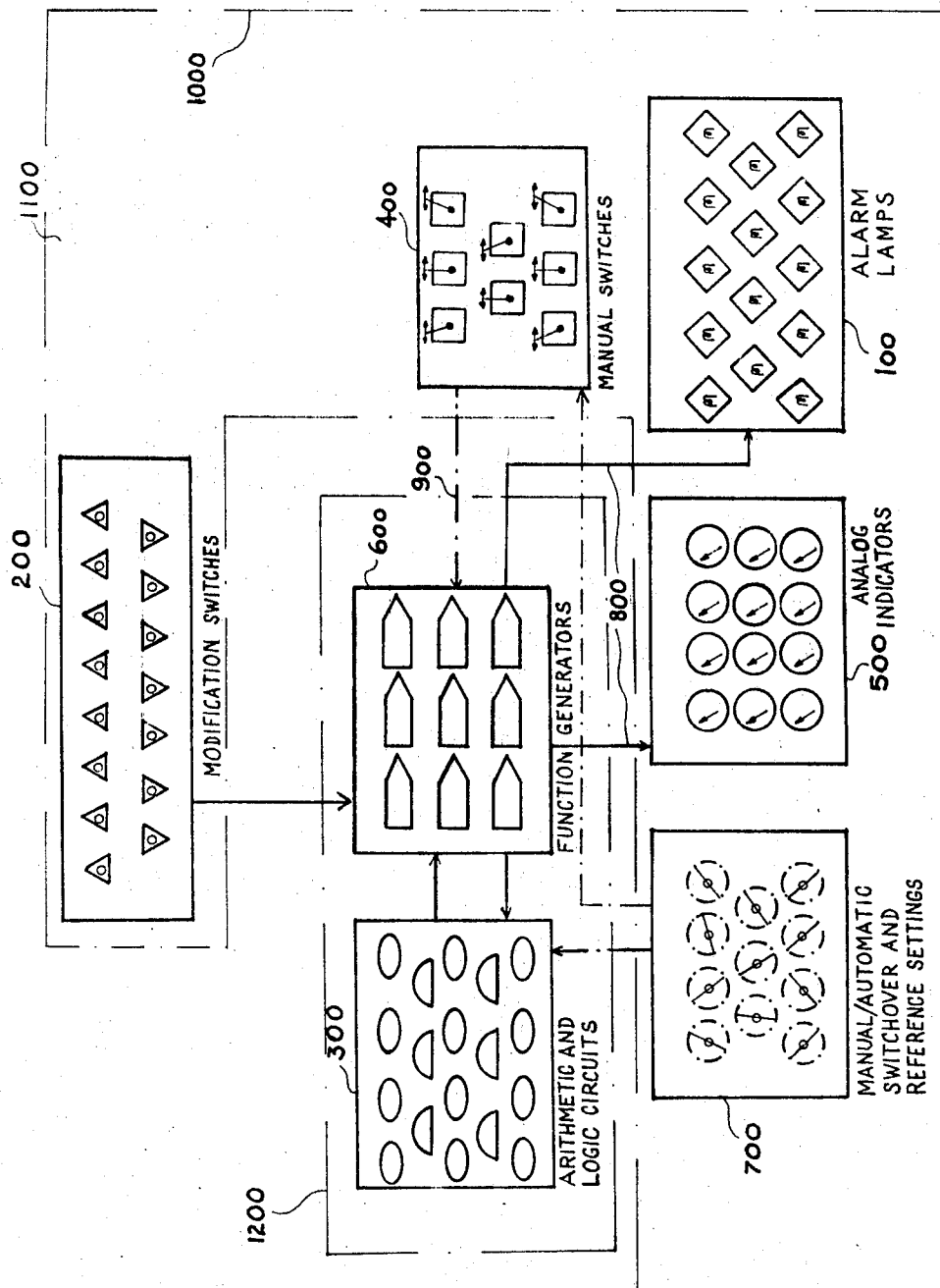
FIG. 1 is a diagrammatic overall view of a training apparatus representing a preferred embodiment.

Throughout the drawing, rectangular and triangular outlines have been used to designate setting and modification switches, respectively; pentagonal outlines signify function generators (with the function diagrammatically plotted inside the pentagon), semicircles symbolize binary gates, heavy circles are regular indicators and diamonds specify alarm devices. Elements of analog circuitry, such as adders, subtractors, multipliers and dividers, have been shown as ellipses and have their respective functions indicated by arithmetical symbols (the collateral input of a divider representing the divisor); contacts framed by similar outlines are used for continuous-voltage electronic switches and gates. Finally, switchover contacts (which may be controlled pneumatically from a remote location) have been indicated by dot-dashed circles.

As indicated by the legends, the system shown in the drawing is designed to simulate a power plant comprising a coal-fed burner with the usual screw-type feeder, pulverizer and oil igniter; a boiler heated by the burner and provided with an injection-type temperater; and a generator driven by a two-stage turbine operating on the steam output of the boiler.

In FIG. 1 we have diagrammatically shown a training apparatus, generally designated 1000, whose principal constituents are a console 1100 and a switch box 1200. Mounted on the console 1100 are several panels including a first panel 100 comprising an array of alarm lamps (symbolized by diamond-shaped outlines), a second panel 200 comprising a set of modification switches (triangular outlines), and further panels 400, 500 and 700 respectively comprising a set of manual switches (rectangular), analog indicators (solid-line circles) and devices (dot-dash circles) for manual/automatic switchover and for the setting of reference voltages. Switch box 1200 incorporates an array 300 of arithmetic and logic circuits, the elements thereof being respectively identified by elliptical and semicircular outlines, and an array 600 of function generators (pentagonal outlines). The several units 100 . . . 700 are electrically or pneumatically interconnected by conductors 800 and fluid conduits 900, the latter connections (dot-dash lines) having been shown by way of example between units 300 and 700 as well as between units 400 and 600.

In the operation of the apparatus 1000, the controls 400 and 700 may be initially preset by the instructor and/or the trainee for normal operation. While the trainee is expected to observe the analog indicators 500 and to watch the alarm lamps 100, the instructor may change some of the switches 200 to simulate the existence of an abnormal condition. The trainee will then have to correct the situation by reversing the abnormal switch positions or taking other remedial action, e.g. performing a compensatory adjustment on one of the switches 400. The instructor may also alter the setting of one or more of the switch-over devices on panel 700, thus simulating the failure of an automatic control and forcing the trainee to make manual adjustments on certain of the switches 200 and/or 400. The alarm lamps 100 may be divided, if desired, into a first group (e.g. red) indicating trouble when lit and a second group (e.g. white) registering an abnormality when extinguished.

In FIGS. 2–13 we have used numerals with hundreds digits 1 through 8 to identify elements forming part of the respective arrays 100, 200, etc. of FIG. 1. Associated elements of different type, related to the same operating condition or parameter, have been given identical numerical designations following the hundreds digit; thus, for example, alarm lamp 101 and switch 201 both relate to the operation of a simulated pulverizer output 565 from which the coal dust is blown into the fire chamber of a simulated burner (instruction-panel control 213, trainee-operated switch 413, selector switch 713, lead 813) heating a simulated steam boiler (216, 416, 716, 816). In the following table, therefore, a listing is given for only one of the elements of each group, beginning with modification switches 201–227 which are all individually identified; reference is made to the legends appearing in the drawing for the function of elements not specifically referred to hereinbelow.

TABLE

FIG. 2(a)

201—Failure of feedscrew
202—Lack of coal for feedscrew
203—Overload of pulverizer
204—Control of primary-air inlet for blower
205—Manual control for feedscrew drive
206—Control of oil burner

FIG. 2(b)

207—Extent of dirt deposit on burner tiles
208—Manual control of exhaust vanes for blower air
209—Outside-air intrusion into blower
210—Changes in fuel affecting its grade and caloric efficiency
211—Manual control of throttle for secondary blower air
212—On/off switch for heat exchanger traversed by secondary blower air about to enter preheater
213—Manual control of burner vanes

FIG. 3

214—Rate of drainage of temperater drum disposed between turbine stages
215—Pressure of water injected into temperater drum and into superheaters for steam entering first and second turbine stages
216—Manual control of boiler-water level
217—Manual throttle control for water injected into interstage superheater (interheater)

FIG. 4

218—Entrance temperature of cooling water for condenser following second turbine stage
219—Manual control of steam pressure for first (high-pressure) turbine stage
220—Manual damper control for first turbine stage
221—Manual control of condensate reflux
222—On/off switch for condensate pump
223—Rate of vapor loss
224—Extent of dirt deposit on turbine blades

FIG. 2(a)

225—Setting of turbine throttle
226—Shut-off switch for turbine
227—Preheater for injection water for superheater of first turbine stage
128—Excessive temperature beyond pulverizer

FIG. 3

129—Insufficient water inlet pressure
130—Water level in temperater drum too high
131—Water level in temperater drum too low
132—Steam temperature after first-stage superheater too high
133—Steam temperature after first-stage superheater too low
134—Steam temperature before interheater too high
135—Steam temperature before interheater too low
136—Steam temperature beyond interheater too high
137—Steam temperature beyond interheater too low

FIG. 4

138—Excessive waste-steam temperature
139—Excessive vapor pressure in condenser
140—Insufficient interheater outlet pressure
141—Insufficient interheater inlet pressure (taps between indicators 140 and 141 lead to similar alarm lamps for interheater pressures at intermediate locations.)

FIG. 2(a)

442—Speed of feedscrew drive
443—Open/closed position of secondary-air inlet
444—Selector for secondary-air influx

FIG. 2(b)

445—Position of secondary-air vent
446—Open/closed position of flue damper

FIG. 3

447—Water-pressure regulator for injector
448—Open/closed position of water pump
449—Open/closed position of water-inlet valve

FIG. 5

450—Start-stop switch for feedscrew drive
451—Presetting switch for standby water pump
452—Start-stop switch for standby water pump
453—On/off switch for air aspirator connected with combustion chamber
454—Presetting switch for burner assembly
455—Presetting switch for blower assembly
456—Start-stop switch for blower assembly
457—Presetting switch for pulverizer assembly
458—Presetting switch for feedscrew assembly
459—Start-stop switch for pulverizer assembly
460—Emergency cut-out switch for pulverizer assembly
461—Emergency cut-out switch for generator assembly
462—Emergency cut-out switch for boiler assembly
463—Emergency cut-out switch for burner assembly

FIG. 2(b)

764—Setting of threshold value for gas analyzer

Figure 5:
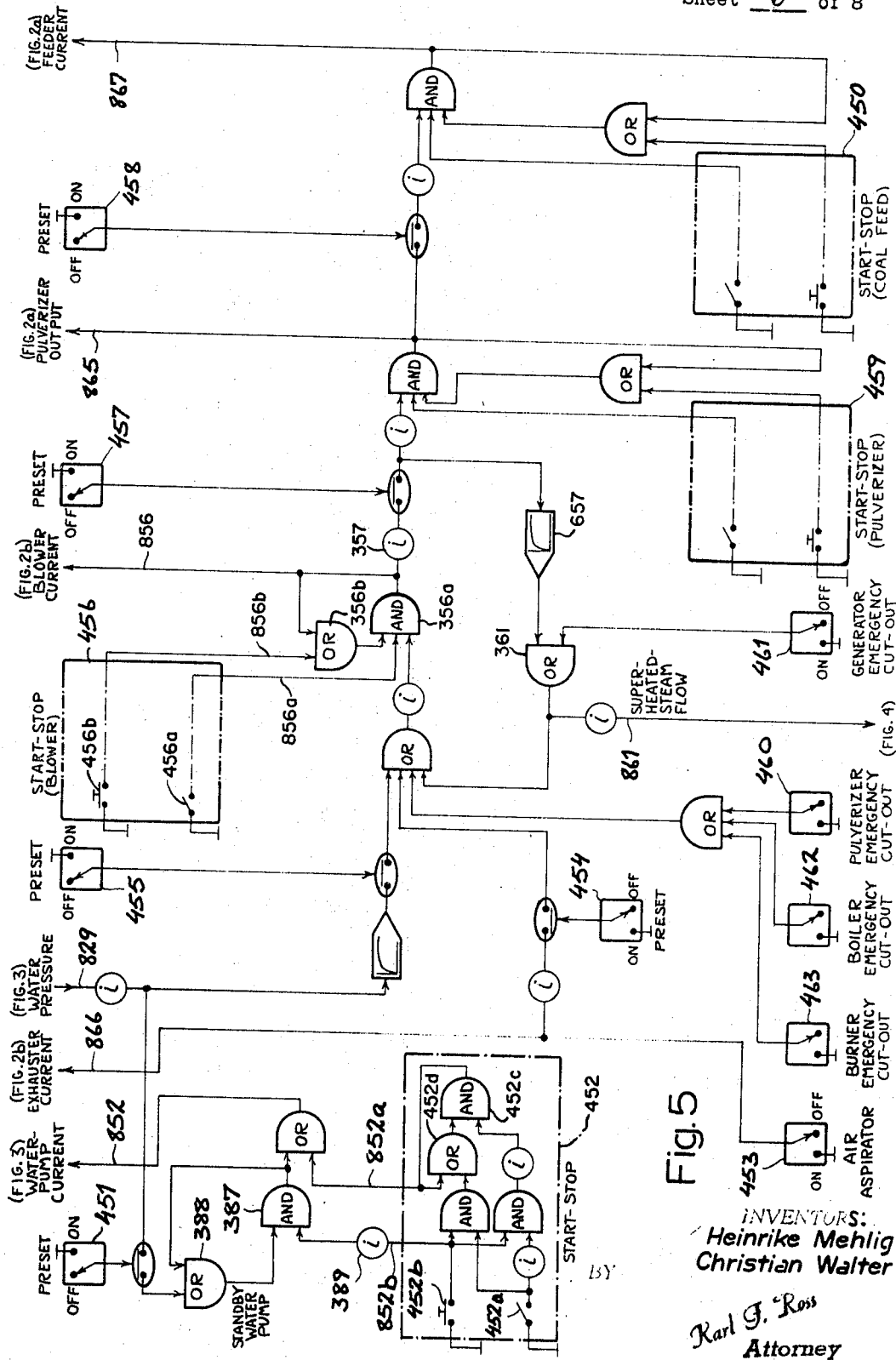

FIGS. 2(a) and 5

865—Conductor for voltage simulating pulverizer output

Figure 2B:
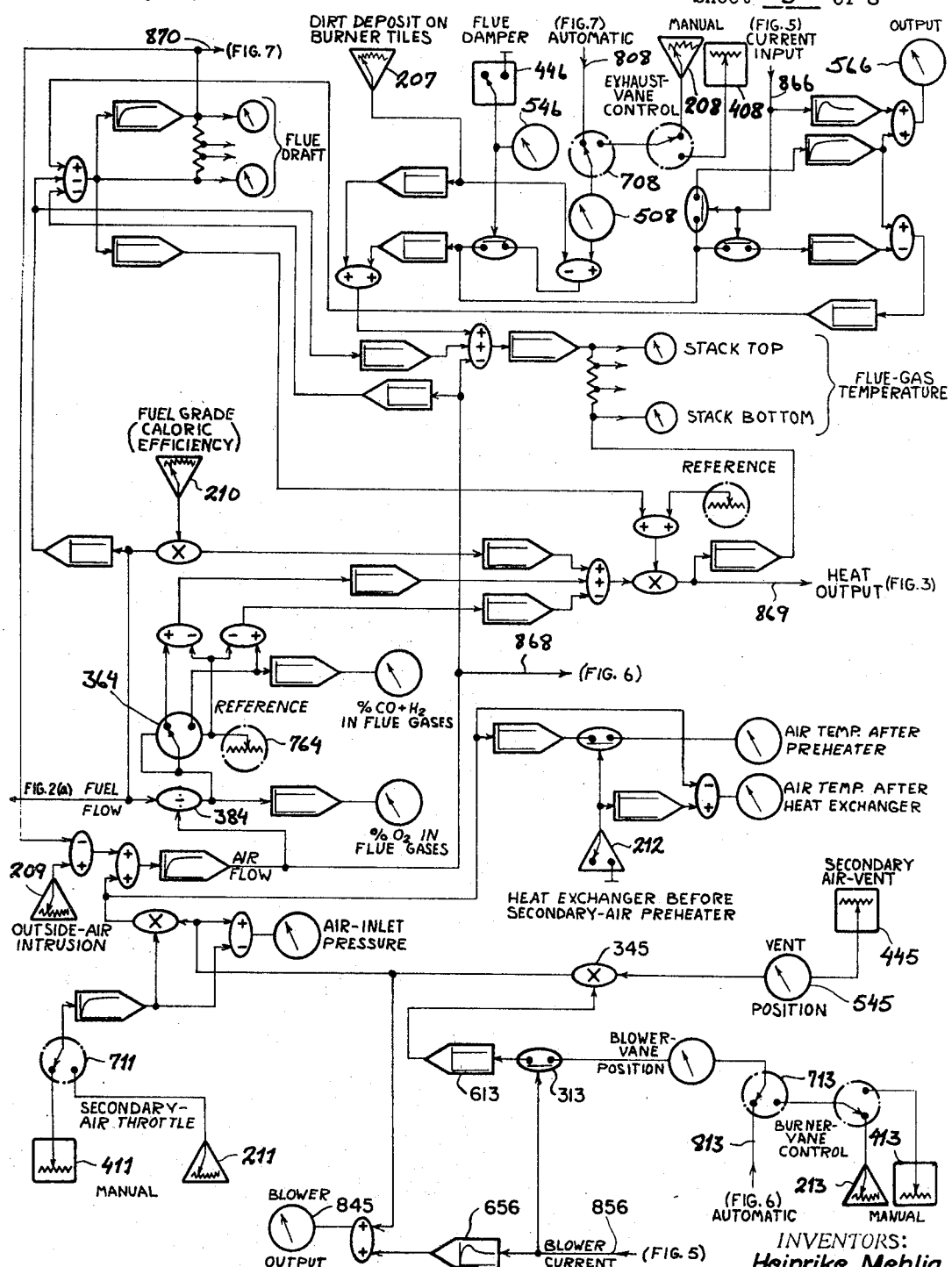

FIGS. 2(b) and 5

866—Conductor for voltage simulating current input of combustion-chamber exhauster FIGS. 2(a) and 5

867—Conductor for voltage simulating input current for feedscrew motor

FIGS. 2(b) and 6

868—Conductor for voltage simulating air flow into burner

FIGS. 2(b) and 3

869—Conductor for voltage simulating heat output of burner

FIGS. 2(b) and 7

870—Conductor for voltage simulating partial vacuum of flue

FIGS. 3 and 13(b)

871—Conductor for voltage simulating pressure of first-stage superheated steam

Figure 11:
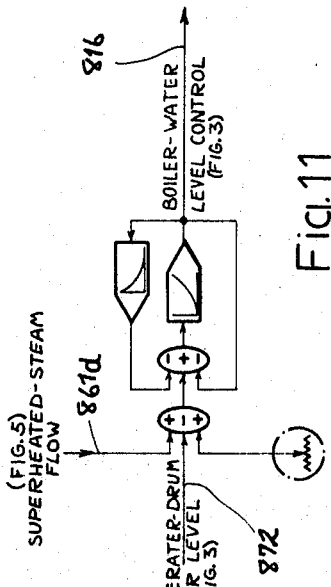

FIGS. 3 and 11

872—Conductor for voltage simulating water level in temperater drum

FIGS. 3 and 4

873—Conductor for voltage simulating inlet temperature of spray water for temperater drum 874a—Conductor for voltage simulating water pressure in temperater drum

Figure 10:
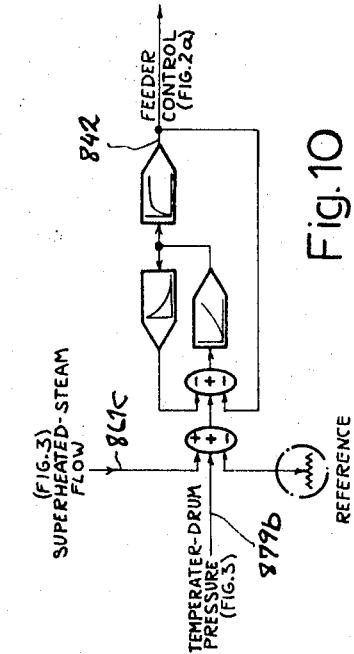
Figure 13:
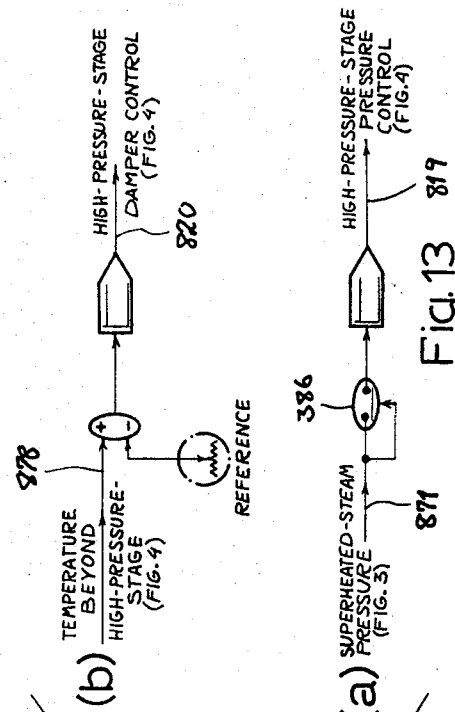

FIGS. 3 and 10

874b—Ditto

FIGS. 3 and 8

875—Conductor for voltage simulating temperature of first-stage superheated steam 875a—Conductor for voltage simulating vapor temperature set at intermediate points (as determined by selector 775) in first-stage superheater 775) in first-stage superheater 876—Conductor for voltage simulating throttle position of water spray for first-stage superheater

FIGS. 3 and 9

877—Conductor for voltage simulating steam temperature in interstage superheater (at locations determined by selector 777)

FIGS. 4 and 13(a)

878—Conductor for voltage simulating temperature beyond first turbine stage

FIGS. 3 and 4

879—Conductor for voltage simulating temperature beyond high-pressure turbine section

Figure 12:
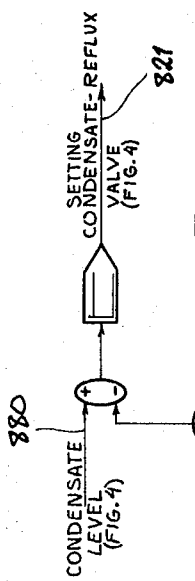

FIGS. 4 and 12

880—Conductor for voltage simulating level of recirculated condensate from second turbine stage In addition, numerals 381, 382, 383 in FIG. 2(a) indicate circuit elements representative of analog adders, subtractors and multipliers, respectively, whereas numeral 384 in FIG. 3(b) shows a circuit element representative of an analog divider. Elements 385 in FIG. 2(a) and 386 in FIG. 13(a) are representative of a normally open and a normally closed analog-type gate reversible by a predetermined minimum voltage at their collateral inputs, the parallel combination of two such gates constituting a switching gate as shown at 364 in FIG. 2(b). Elements 387, 388 and 389 in FIG. 5 represent, respectively, an AND gate, and OR gate and a binary inverter whereas element 390 in FIG. 2(a) designates a NAND gate. Representative of various function generators are an element 691 of linear characteristic (e.g. a resistance-coupled amplifier), elements 692 and 693 of nonlinear characteristics due to partial differentiation (e.g. amplifiers in series with parallel RC circuits), an element 694 with nonlinear characteristic due to integration (e.g. amplifier with shunt capacitor), all in FIG. 2(a), and an element 695 (FIG. 3) of distinctly differentiating characteristic (e.g. amplifier with series condenser). A short horizontal line at the end of a vertical conductor in FIGS. 2–5 represents a source of constant voltage.

With reference to elements 387, 388 and 389 (FIG. 5) it may be pointed out that the circuit constituted thereby has a feedback path through OR gate 388. Upon failure of a signal on lead 829 due to lack of pressure from the simulated primary water pump, switch 451 may be returned to its "ON" position, thereby making AND gate 387 conductive to send water-pump current over lead 852 from the simulated standby water pump. This current is sent irrespectively of the subsequent condition of the preset switch 451 or lead 829.

Under these conditions of external-feedback-loop conduction, if start-stop switch 452 is operated by brief actuation of pushbutton 452b, with contact 452a in its closed position, potential on lead 852b momentarily blocks AND gate 387, yet lead 852a is concurrently energized to keep the standby pump operated. If, however, at the time of this operation the preset switch 451 had been returned to its OFF position and/or water-pressure potential had been restored to lead 829, the operation of start-stop switch 452 would have caused a transfer of the maintenance of the simulated operation of the standby pump from the external feedback loop to the internal feedback loop of this switch constituted by AND gate 452c and OR gate 452d thereof. Otherwise, such operation would break the external feedback circuit of the standby pump only momentarily, since AND gate 387 would be blocked only so long as pushbutton 452b were held depressed.

Start-stop switch 452 may also be operated to terminate the operation of the simulated standby water pump when presetting switch 451 has been returned to its OFF position and/or potential has been restored to lead 829. Momentary closure of pushbutton 452b, with contact 452a now in its open position, causes conduction to cease in the external feedback loop, and the internal feedback loop is not activated to send current over lead 852a.

Thus, the external feedback connection from AND gate 387 to OR gate 388 maintains the output lead 852 energized, in the absence of a change in the energization of conductor 829, independently of the operation or non-operation of start-stop switch 452; conversely, the internal feedback loop of the latter switch, extending from an AND gate 452c to an OR gate 452d thereof, enables this switch to apply voltage to the lead 852 irrespectively of the presence or absence of an alarm signal on conductor 829. Since any reversal of switch 452 requires a depression of its pushbutton 452b, such depression in the closed state of contact 452a would transfer the maintenance of the simulated operation of the standby pump from the external to the internal feedback loop if, with switches 448 and 449 (FIG. 3) closed, the energization of output lead 852 has restored normal voltage to input conductor 829 via the associated circuit elements shown in FIG. 3.

Similar AND/OR feedback loops are shown associated in FIG. 5 with start-stop switches 450, 456 and 459 whose circuitry, however, has been indicated only diagrammatically; these latter switches, of course, are of the same type as switch 452.

Switch 456, for example, has an output lead 856a, terminating at an AND gate 356a, and another output lead 856b, extended to an OR gate 356b together with a feedback connection from gate 356a. When the switch 456 is turned on (by closure of contacts 456a and depression of pushbutton 456b), gate 356a conducts if all the cutout switches 460–463 are in their off-positions and if, should switches 454 and 455 be closed, there is voltage on the corresponding leads 866, 829. Another feedback path through an inverter 357, a nonlinear function generator 657 and an OR gate 361, effective in the closed state of switch 457, prevents re-energization of lead 856 via gate 356a once conduction through it has been cut off, thereby making switch 456 ineffectual to restart the simulated blower; lead 856, when energized, closes a switch 313, FIG. 2(b), thereby feeding multiplier 345 by way of a linear function generator 613 to apply an analog voltage from switch 445 to an indicator 845 which also receives the output of a nonlinear function generator 656 responding directly to voltage on this lead. Thus, the various feedback circuits shown in FIG. 5 may serve, under certain conditions, to disable an associated start-stop switch either for stopping or for starting purposes.

It is to be understood that the disclosed system is somewhat simpler than would be desirable in actual practice inasmuch as certain elements may be duplicated to symbolize plural feedscrews, burners, blowers and so forth; also, various supplemental switches and indicators relating to, for example, the simulated lubrication of bearings have been omitted since they are not organically connected with the basic system shown in FIGS. 2–13. Naturally, the invention is applicable to simulators for a wide variety of industrial plants, its specific use in conjunction with a simulated electric power plant being disclosed herein solely by way of example.

A programmer (not shown) may be utilized for the actuation, in a predetermined manner, of the several automatic controls described and illustrated, e.g. in a sequence representative of the starting up and/or the shutting down of the simulated plant.

We claim:

1. In a training apparatus for the operation of an industrial plant, in combination:

a source of operating voltage;

a start-stop switch having an output lead selectively connectable to said source by said switch;

indicator means provided with a conductor symbolizing, by a predetermined first state of energization, a normal operating condition of a simulated unit of said plant;

local circuitry connecting said output lead to said conductor for normally enabling said start-stop switch to establish said first state of energization in said indicator means; and switch means connected to said circuitry for establishing an alternate state of energization in said indicator means in a predetermined position of said switch means symbolizing an abnormal condition of said plant, said circuitry including gate means for making said start-stop switch ineffectual to reestablish said first state of energization in said predetermined position of said switch means, said start-stop switch being provided with alternately openable and closable first contact means, momentarily closable second contact means for initiating a change in the connection between said source and said output lead according to the position of said first contact means, and a logic network switchable by said second contact means and provided with a feedback circuit for alternately maintaining said output lead connected to and disconnected from said source irrespectively of the position of said first contact means, said gate means comprising an AND gate having a first input connected to one of said contact means and a second input connected to said switch means, the connection between said second input and said switch means including an OR gate having an alternate input connected in a feedback path to the output of said AND gate.

2. The combination defined in claim 1, further comprising a manually adjustable generator of analog voltage representing an operative function of the simulated unit connected between said conductor and said logic circuitry, said indicator means being responsive to changes in said analog voltage, said logic circuitry modifying the response of said indicator means to said analog voltage.

3. The combination defined in claim 1 wherein said gate means comprises an AND gate having an output and an input tied together by a feedback connection.

4. The combination defined in claim 3 wherein said feedback connection includes an OR gate with an alternate input connected to said switch means.

5. The combination defined in claim 4 wherein said feedback connection further includes a nonlinear function generator in series with said OR gate.

6. The combination defined in claim 1 wherein said first input is connected to said second contact means, said AND gate being provided with a feedback loop including an OR gate in the connection between said first input and said second contact means.

References Cited

UNITED STATES PATENTS

| | | | |
|---|---|---|---|
| 2,808,659 | 10/1957 | Dehmel | 35—12 |
| 2,978,594 | 4/1961 | Walker | 307—218 |
| 2,496,617 | 2/1950 | Burelbach | 35—13 |
| 3,031,776 | 5/1962 | Randall et al. | 35—13 |
| 3,036,772 | 5/1962 | Pughe et al. | |
| 3,058,663 | 10/1962 | Barnard. | |
| 3,061,945 | 11/1962 | Hawkins | 35—13 |
| 3,146,533 | 9/1964 | Carmody et al. | 35—13 |
| 3,237,318 | 3/1966 | Schager | 35—13 |

JEROME SCHNALL, *Primary Examiner.*

WALTER W. NIELSEN, *Assistant Examiner.*